United States Patent [19]

Kolensky et al.

[11] 3,869,573

[45] Mar. 4, 1975

[54] MULTIPOINT JUNCTION UNIT PROVIDING EXCLUSIVE INTERCONNECTIONS OF BRANCH PAIRS

[75] Inventors: Leo Michael Kolensky, Irvington; Randolph John Pilc, Holmdel; Gabriel Gary Schlanger, West Orange; Allan Howard Willand, Loch Arbour, all of N.J.

[73] Assignee: Bell Telephone Laboratories, Incorporated, Murray Hill, Berkeley Heights, N.J.

[22] Filed: Mar. 7, 1974

[21] Appl. No.: 448,807

[52] U.S. Cl. .................. 178/73, 178/69 G

[51] Int. Cl. .................. H04l 11/00

[58] Field of Search .................. 178/73, 69 R, 69 G; 325/31; 340/151, 168 R

[56] References Cited

UNITED STATES PATENTS

| | | | |
|---|---|---|---|
| 2,972,017 | 2/1961 | Davey | 178/73 |
| 3,002,053 | 9/1961 | Gilman et al. | 178/73 |
| 3,040,131 | 6/1962 | Bruder | 178/73 |
| 3,331,923 | 7/1967 | Neiswinter et al. | 178/69 G |
| 3,435,142 | 3/1969 | Crowson et al. | 178/73 |
| 3,786,424 | 1/1974 | McVoy et al. | 340/151 |

*Primary Examiner*—Thomas A. Robinson
*Attorney, Agent, or Firm*—Roy C. Lipton

[57] ABSTRACT

A synchronous multipoint data network is formed by symmetrical junction units. Each junction unit provides signal paths that interconnect four two-way branch lines which extend to station line loops or are connected to branch lines of other junction units. Data signals from any branch are broadcast by the junction unit to all other branches. If data signals are simultaneously received from two branches, an exclusive two-way connection is formed therebetween. Other branches may then broadcast data signals to each other or form a second exclusive two-way connection. The junction unit also generates "idle" control words and sends them to branches when they are not receiving data signals.

8 Claims, 6 Drawing Figures

MULTIPOINT JUNCTION UNIT PROVIDING EXCLUSIVE INTERCONNECTIONS OF BRANCH PAIRS

FIELD OF THE INVENTION

This invention relates to data communication networks and, more particularly, to network hubs or junctions which interconnect branch lines.

DESCRIPTION OF THE PRIOR ART

A private line data network shared, in parallel, by a plurality of line stations is known as a multipoint or party line. Each station has the capability of sending and receiving data over a line loop extending to a central office of the common carrier. At the central office, the line loop is connected to a branch line which is interconnected with other similar branch lines by a hub or junction unit. Each of these other branch lines may be connected to another station or may extend to another junction unit in the same or in another central office. The multipoint line is formed by all of the branch lines coupled to the interconnected hubs.

In one type of multipoint line, each line station communicates with all of the other line stations. This latter type of multipoint line requires a "symmetrical" junction unit which interconnects each branch with all of the other branches. Incoming data from any branch is thus broadcast to all of the other branches, subject to the condition that a branch station can receive broadcasted data from only one other branch at a time.

In the copending application of R. J. Pilc—G. G. Schlanger, Ser. No. 427,318, filed Dec. 21, 1973, there is disclosed a multipoint network provided with symmetrical junction units which terminate three two-way branch lines; it also being suggested that the junction unit can terminate an unlimited number of branches. Each junction unit includes signal paths which interconnect the incoming side of each branch to the outgoing sides of all of the other branches, the junction unit thus having the capability of broadcasting data from any branch to all of the other branches. This network is incorporated into a synchronous data system wherein each branch line conveys, in each direction, a data word designating message text information or a control word designating supervisory information (such as an idle branch condition), each word being aligned with words on other branches.

The junction unit, disclosed in the R. J. Pilc et al. application, enables two of the stations to intercommunicate. Each station sends its message information (in the form of data words) to the network. When data words are concurrently received from the two branches, the junction unit severs or blocks the signal paths connected to all of the other non-signaling or idle branches, sending control words to these non-signaling branches to inform the branch stations that message text information is not being broadcast to the stations. Only two paths now remain open; namely, the paths interconnecting the incoming side of each active branch to the outgoing side of the other active branch, whereby an exclusive two-way interconnection is formed between the active branches. Thus, in accordance with the teachings in the R. J. Pilc et al. application, an exclusive interconnection is formed between two branches by precluding all of the other branches from communicating with the network.

It is a broad object of this invention to permit branches not part of an exclusive interconnection to communicate with the data network.

It is a further object of this invention to permit branches not part of an exclusive interconnection to broadcast to each other or to form a second subsequent exclusive interconnection.

SUMMARY OF THE INVENTION

In accordance with the broad object of this invention, individual ones of the signal paths are selectively severed or blocked in the event that signals are simultaneously received from either one (but not both) of the branches that the path interconnects and from a branch not connected to the signal path; the path remaining unblocked if neither one (or both) of the signaling branches is interconnected by the signal path. As a result, an exclusive interconnection between two signaling branches is formed (by severing signal paths connecting the two signaling branches to other branches) while signal paths interconnecting the other branches to each other remain unblocked to permit them to communicate with each other.

In the illustrative embodiment of the invention, the junction unit stores a designation that two branches are locked when data is concurrently received from the branches. Additionally, each signal path includes an individual gate circuit that disables or blocks the signal path when at least one of the branches interconnected by the path is designated locked with a branch which is not the other one of the interconnected branches, the gate circuit being independent of stored designations of locked branch pairs which include neither one of the branches interconnected by the signal path.

The junction unit store comprises a plurality of individual storage units for each of the various pairs of branches, each storage unit being arranged to store the locked designation of the branch pair individual thereto to preclude storage in other units individual to pairs which include one but not both of the locked branches. Other units individual to pairs which include none of the locked branches are not precluded, thus permitting additional concurrent designations which result in the formation of additional exclusive interconnections.

In accordance with a feature of this invention, disclosed hereinafter, the designation that two branches are locked is stored by the junction unit when the branches are sending data words. The stored designation is then cleared if one or the other of the branches becomes idle, as indicated by the reception of the control words.

In accordance with another feature of this invention, the junction unit locally generates idle control words and sends the idle control word to the several branches when the branches are not receiving data words from another one of the branches. Each branch thus receives idle control words when all of the other branches are idle or where an exclusive interconnection has been formed by two of the other branches and the remaining other branches are idle.

The foregoing and other objects and features of this invention will be more fully understood from the following description of an illustrative embodiment thereof taken in conjunction with the accompanying drawings.

DETAILED DESCRIPTION

Figure 1:
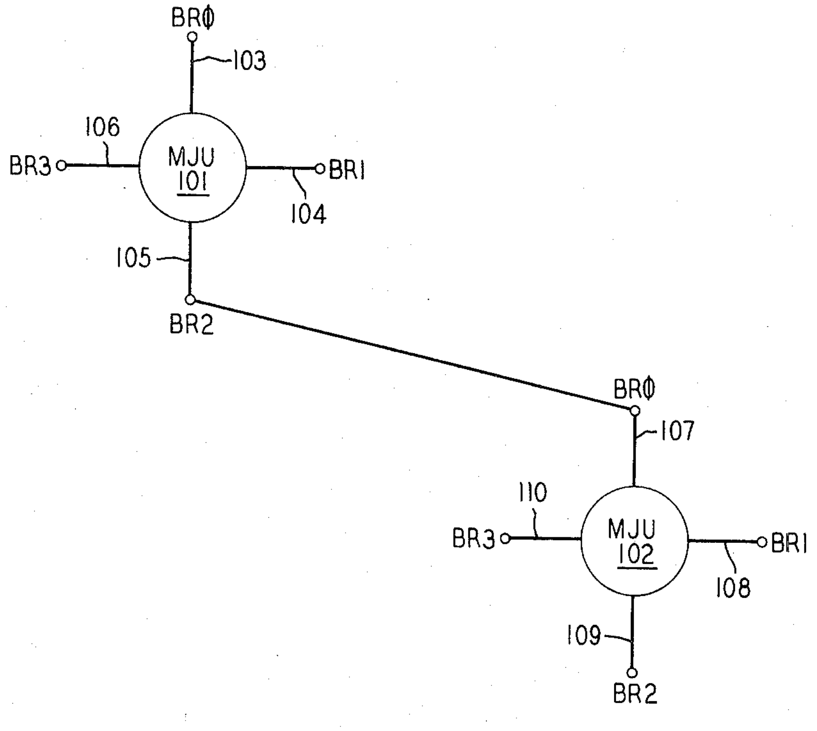
FIG. 1 shows, in schematic form, a multipoint network of branch lines coupled to interconnected symmetrical junction units arranged in accordance with this invention.

A portion of a synchronous multipoint communication network is shown in FIG. 1 and principally comprises symmetrical multipoint junction units 101 and 102. Multipoint junction unit 101 terminates four branches (BR0, BR1, BR2 and BR3), identified by lines 103, 104, 105 and 106. Each of the branches accommodates 2-way, or full-duplex, line signaling. Similarly, multipoint junction unit 102 terminates four branches, identified as lines 107 through 110, with line 107 being connected to line 105 of multipoint junction unit 101. The others of the branches of the multipoint junction units may extend to other junction units; to remote signaling stations (via line loops) which are arranged to send and receive synchronous data; or to other signaling equipment which are similarly arranged to send and receive data. It is to be noted that the junction units, including the two shown in FIG. 1, and the signaling equipment may be at separate offices.

Figure 4:
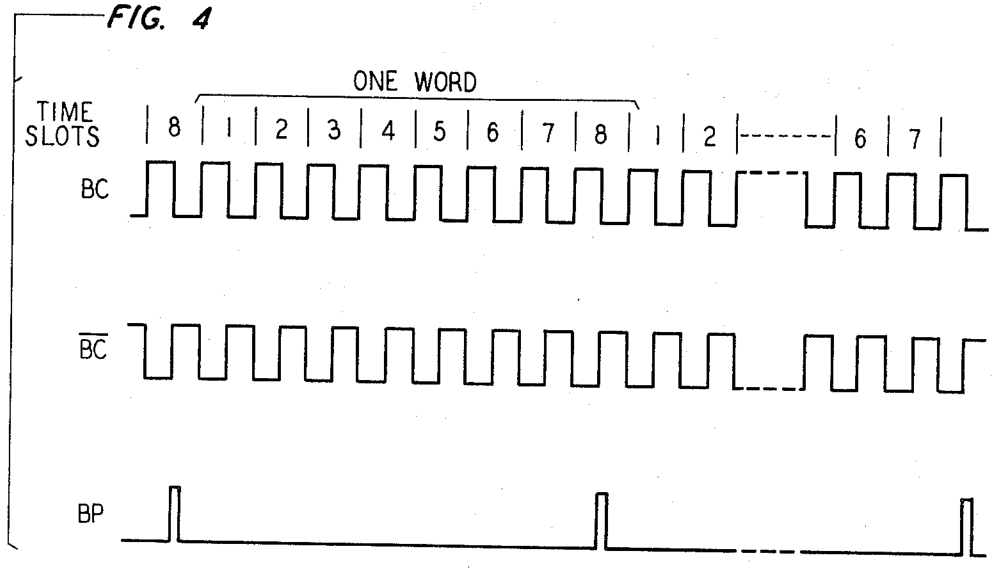
FIG. 4 depicts timing waves produced by clocking equipment shown in FIG. 3.

All of the sending and receiving equipment and circuitry at the remote stations and the multipoint junction units are controlled by a common clock or by synchronized clocks. Transmission is in a word or byte format, each word having eight bits and all of the signaling from whatever source being synchronized so that each bit of a word is in the same time slot as a corresponding bit of a word being transmitted from any other equipment. These time slots are represented in FIG. 4, wherein time slots numbered 1 through 8 designate one word. In accordance with the signaling arrangement, the bit in the eighth time slot interval determines whether the word constitutes a data word ("1" bit), which provides message text information, or a control word ("0" bit), which provides housekeeping information. The housekeeping information for the purposes of this disclosure may constitute line signaling conditions, such as an "idle" condition designating the absence of message text. It is contemplated that each line or branch will always contain a word, data or control, and therefore will always indicate either message text information or an idle condition existing on the branch.

In accordance with this invention, each multipoint junction unit is symmetrically arranged with a plurality of branches. As shown in FIG. 1, each junction unit has four branches. As described in detail hereinafter, however, the multipoint junction unit is arranged in modular form, permitting the addition of additional branches, the number of branches of each unit being unlimited.

The multipoint junction unit is normally arranged to interconnect, via a signaling path, the incoming side of each branch of the outgoing sides of all of the other branches. The incoming sides of the several branches are monitored to determine whether the branch is idle or conveying data words. Under the condition that all of the branches are idle, the multipoint junction unit sends the idle control word to the outgoing sides of all of the branches. If one of the branches sends data, the data received from the branch is broadcast via the signal paths to the outgoing sides of all of the other (idle) branches; at this time the idle control word is sent only to the outgoing side of the signaling branch.

If two of the branches simultaneously send data to the multipoint junction, the junction unit designates in a store that these two branches are locked. The paths interconnecting each of these branches with each of the unlocked branches are severed. The only paths connected to these branches not severed are those which interconnect the incoming side of each one of the locked branches with the outgoing side of the other one of the locked branches and an exclusive interconnection of the two locked branches is thereby formed. At the same time the multipoint junction unit sends the idle control word to the outgoing sides of all of the unlocked branches.

In the event that, with two of the branches locked, a third branch sends data to the multipoint junction unit, this data is broadcast to the remaining unlocked branches since signal paths not connected to the locked branches have remained unsevered. With the third branch sending data, the multipoint junction unit sends the idle control word to the outgoing side of this third branch.

In the event that a fourth branch joins the third branch in sending data to the multipoint junction unit while the other two branches are locked, the multipoint junction unit now stores the designation that these third and fourth branches are locked. The paths interconnecting the third and fourth branch with other branches are severed and the signal paths interconnecting the third and fourth branches form a second exclusive interconnection. If the multipoint junction unit terminates additional branches, these branches now receive idle control words. In addition, if the first and second branches stop sending, the stored designation is cleared, the branches are unlocked, and the paths to the branches are closed to eliminate the exclusive interconnection therebetween. The exclusive interconnection between the third and fourth branches is maintained, however, since in response to their designation as being locked, paths interconnecting these branches with the first and second branches had been severed, as noted above.

In summary, when no branches are sending, the multipoint junction unit sends the idle control word to all of the branches. When one branch is sending, data therefrom is broadcast to all of the other branches with the idle control word being sent to the broadcasting branch. When two branches concurrently send, the multipoint junction unit stores a designation that these branches are locked and forms an exclusive interconnection between the two locked branches, sending the idle control word to the unlocked branches. When a third branch sends, the data is broadcast to the remaining unlocked branches, the idle word being transmitted to the broadcasting branch. Finally, when a fourth branch concurrently sends to the multipoint junction unit, a designation that the third and fourth branches are locked is stored and the unit forms an exclusive interconnection between these latter two locked branches.

As noted above, branch BR2 of multipoint junction unit 101 is connected to branch BR0 of multipoint junction unit 102. Data from another branch of multipoint junction unit 101, such as branch BR0, is passed by way of lead 103 to multipoint junction unit 101 and broadcast out through the other branches. This data is thus broadcast to branch BR2 and passed to branch BR0 of multipoint junction unit 102, which, in turn, broadcasts the data to its branches BR1 through BR3. Assume now that a response to the data is provided by branch BR2 of multipoint junction unit 102. This response is passed to line 109 and, since multipoint junction unit 102 is simultaneously receiving data from line 107, an exclusive interconnection is formed between branches BR2 and BR0 of multipoint junction unit 102. The response data from branch BR2 is therefore passed to branch BR0 of multipoint junction unit 102 and then to branch BR2 of multipoint junction unit 101. Multipoint junction unit 101 now forms an exclusive interconnection between branches BR2 and BR0 since it is simultaneously receiving data from both of these branches. The station connected to branch BR0 of multipoint junction unit 101 can now interchange data with the station connected to branch BR2 of multipoint junction unit 102. At the same time, branches BR1 and BR3 of multipoint junction unit 101 can individually broadcast data to the other unlocked branches of multipoint junction unit 101 or interchange data therebetween. Similarly, branches BR1 and BR3 of multipoint junction unit 102 can broadcast data or interchange data therebetween.

Figure 2:
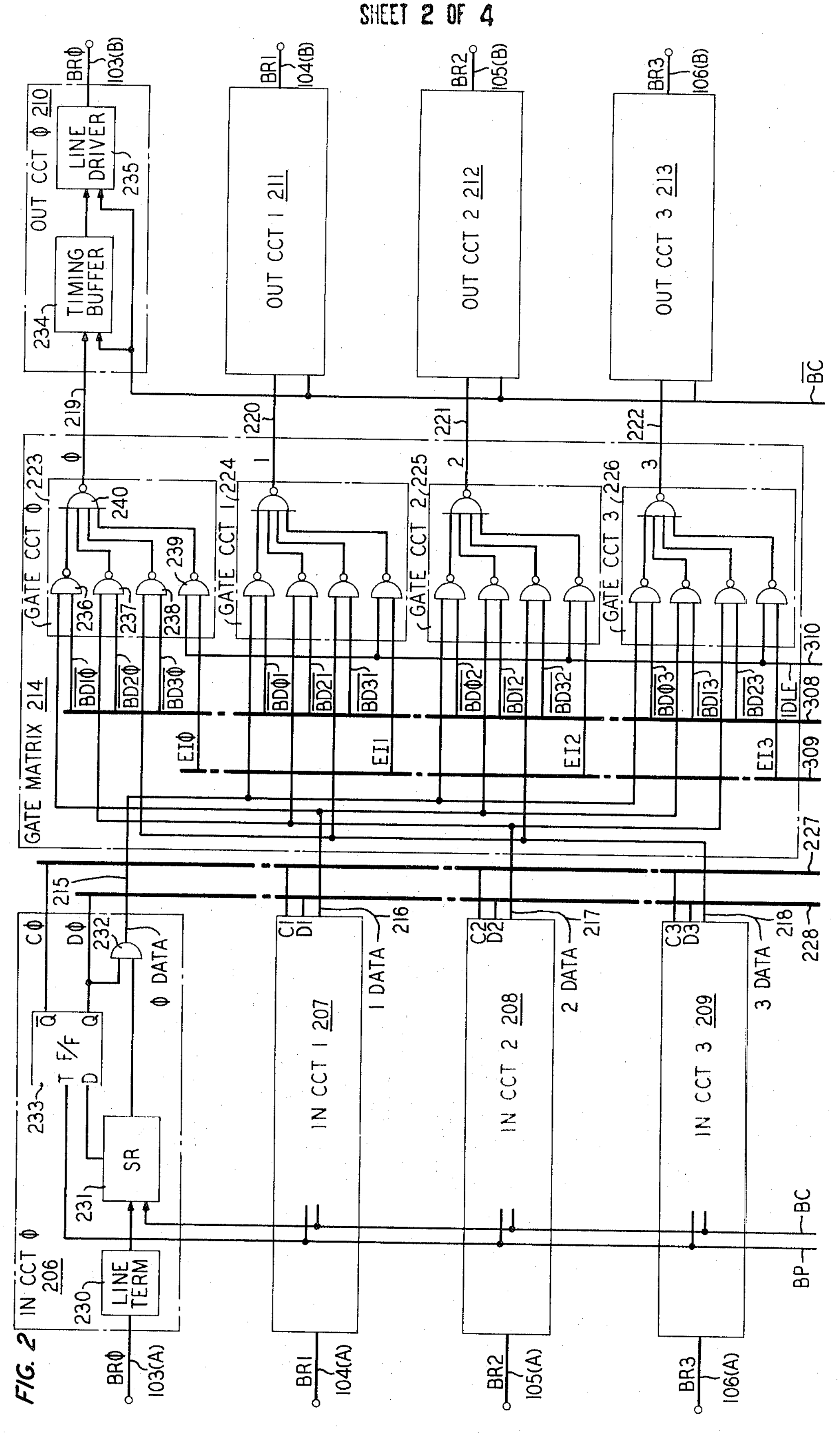
FIGS. 2 and 3, when vertically aligned, disclose, in schematic form, the details of circuitry and equipment of a four-branch symmetrical junction unit arranged in accordance with this invention.
Figure 3:
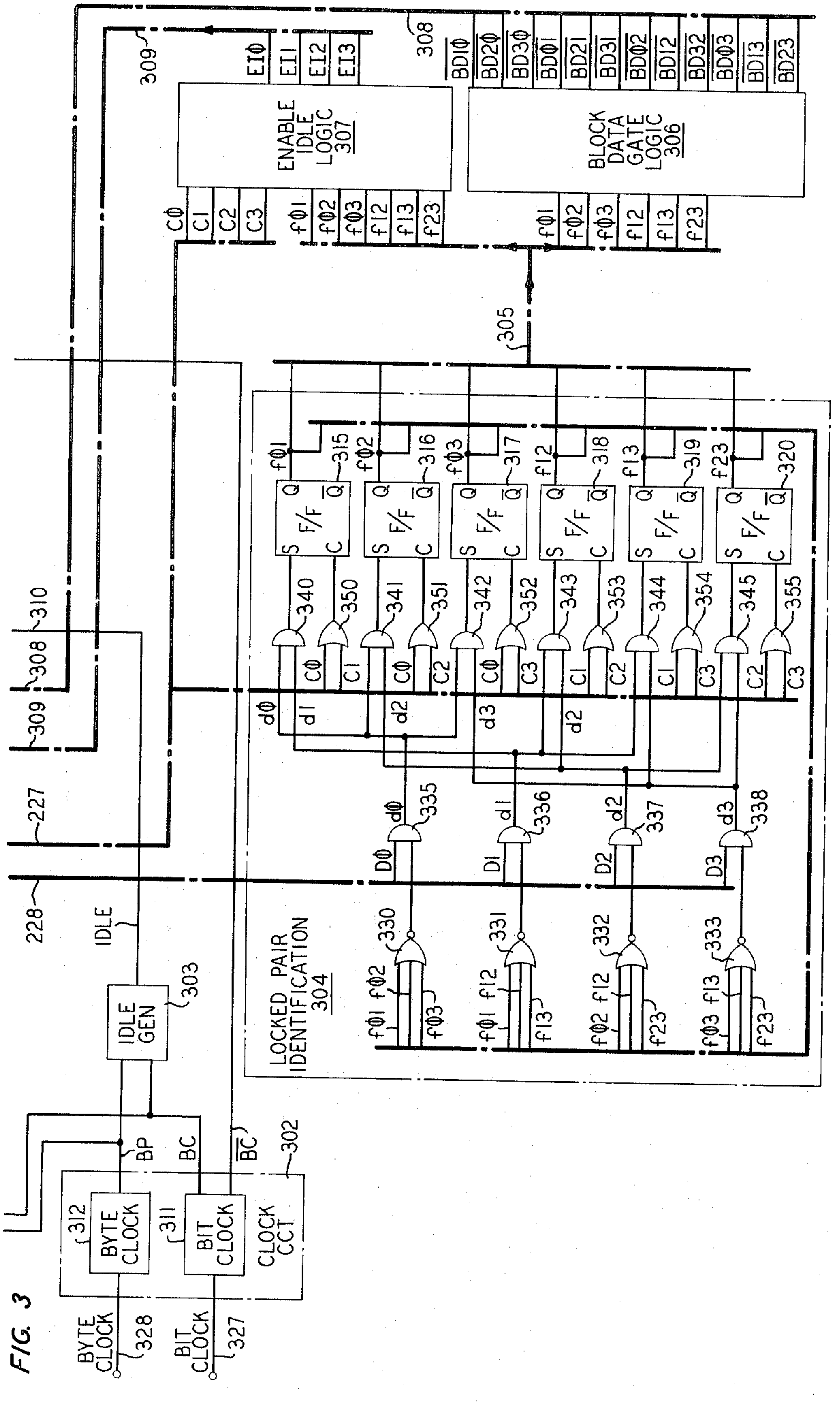

FIGS. 2 and 3 disclose the details of a symmetrical four-branch multipoint junction unit, such as multipoint junction unit 101. As seen in FIG. 2, the incoming paths 103(A), 104(A), 105(A) and 106(A) of branches BR0, BR1, BR2 and BR3 terminate in incoming circuits 206, 207, 208 and 209, respectively. The outgoing paths 103(B), 104(B), 105(B) and 106(B) extend from the outgoing circuits 210, 211, 212 and 213, respectively. Each of the incoming circuits 206, 207, 208 and 209 regenerates the incoming data under the control of a bit clock pulse on lead BC and monitors the eighth bit of each word under control of the byte clock pulse on lead BP to determine whether the word is a data word or control word, providing this information to leads D0, D1, D2 and D3 and to leads C0, C1, C2 and C3, wich leads are then combined in cables 227 and 228. In addition, each incoming circuit blocks each control word and passes each data word, applying the passed data word via leads 215, 216, 217 and 218 to gate matrix 214.

Gate matrix 214 provides the signal paths which broadcast incoming data derived from leads 215, 216, 217 and 218, which exclusively interconnect two branches, and which distribute the idle control word on IDLE lead 310 to appropriate outgoing circuits. Gate matrix 214 is controlled by information on cables 308 and 309, distributing these data and control words to leads 219, 220, 221 and 222, which leads extend to outgoing circuits 210, 211, 212 and 213. Each outgoing circuit, such as outgoing circuit 210, then retimes the data applied thereto under control of bit clock pulses on lead $\overline{BC}$, applying the retimed data to the outgoing paths of the branches.

The bit clock pulses and the byte clock pulses are provided by clock circuit 302, FIG. 3. Clock circuit 302 terminates clock leads 327 and 328 which extend to an office reference clock (not shown), providing the bit clock and byte clock pulses. These pulses are applied to bit clock circuit 311 and byte clock circuit 312 in clock circuit 302. Bit clock circuit 311 regenerates the clock pulses, providing a bit clock pulse represented by timing wave BC in FIG. 4, and passing the bit clock pulse to similarly identified lead BC. Bit clock circuit 311 also generates an inversion of the bit clock pulse represented by timing wave $\overline{BC}$ and applies the wave to lead $\overline{BC}$. Byte clock circuit 312 regenerates the byte clock pulse, and the regenerated byte pulse, represented by timing wave BP in FIG. 4, is passed to lead BP. As shown in FIG. 4, the bit clock pulse is aligned with the time slots of the bits in each byte and the byte clock pulse occurs during the eighth time slot of each word.

The bit clock and the byte clock pulses are passed to idle generator 303, which comprises a conventional word generator which repetitively generates the idle word. The generated word is aligned in the appropriate time slots by the bit clock and byte clock pulses and is passed to IDLE lead 310.

The common control for the multipoint junction units, which generates the information on cables and 308 and 309 that controls gate matrix 214, comprises locked pair identification circuit 304, enable idle logic circuit 307 and block data gate logic circuit 306. In general, these three circuits cooperate in deriving information from the C- leads and the D- leads in cables 227 and 228 as to whether incoming branches are idle or signaling and, with this information, determine whether pairs of branches are concurrently signaling and therefore are to be locked together in an exclusive interconnection; and whether various permutations of incoming branches are idle. With this information the common control circuits apply appropriate signals to cables 308 and 309 to enable gate matrix 214 to provide its functions of broadcasting data and/or providing exclusive interconnections and/or distributing idle control words.

The function of identifying the branches which are to be locked together is provided by locked pair identification circuit 304. The information for identification circuit 304 is provided by the leads in cables 227 and 228. As previously noted, cable 227 includes leads C0 through C3 and these leads provide information as to whether each of the several branches is sending control words and is, therefore, in the idle condition. Cable 228 includes leads D0 through D3, which leads provide information as to whether the several branches are sending data words and are, therefore, in the signaling condition. With this information, identification circuit 304 provides appropriate signals to output leads F01, F02, F03, F12, F13 and F23. More specifically, if two branches, such as branches BR0 and BR1, are concurrently signaling, identification circuit 304 stores an indication that these two branches are locked together and applies a "1" signal, or high condition, to lead F01. Similarly, if any other pair of branches concurrently signal, identification circuit 304 stores an indication that this pair is locked together and applies a "1" signal to the lead having numbers corresponding to the branch numbers. It is noted that when a pair of branches is locked together neither branch can then be locked to a branch other than the other branch of this pair. Other branches differing from the locked pair can be concurrently locked together, however. Thereafter, if idle words are received from a branch in a locked pair, which information is derived from the C lead of the incoming circuit, the stored identification is cleared and the indication on the output lead of identification circuit 304 is removed.

The output leads of identification circuit 304 are combined in cable 305 and passed to inputs of enable idle logic circuit 307 and block data gate logic circuit 306. Block data gate logic circuit 306 processes the information, identifying the locked pairs, if any, and applies appropriate signals to its output leads $\overline{BD10}$, $\overline{BD20}$, $\overline{BD30}$, $\overline{BD01}$, $\overline{BD21}$, $\overline{BD31}$, $\overline{BD02}$, $\overline{BD12}$, $\overline{BD32}$, $\overline{BD03}$, $\overline{BD13}$ and $\overline{BD23}$. These leads are combined in cable 308 and passed to gate matrix 214 to designate which signal paths are to be blocked (or to be completed to provide exclusive interconnections or broadcast of data). Each output lead is individual to a signal path, as indicated by the numeral portion of the lead identification; lead $\overline{BD10}$ being individual to the signal path interconnecting the input side of branch BR1 to the output side of branch BR0. Application of a "0" signal to the output lead instructs gate matrix 214 to block or sever the signal path; a "1" signal to enable or complete the path.

In general, block data gate logic circuit 306 is a static logic circuit which provides the logic that a signal path is blocked or severed if at least one branch interconnected by the signal path, but not both branches, is identified as part of a locked pair. For example, if branches BR0 and BR1 are locked together as determined by identification circuit 304, then gate logic 306 informs gate matrix 214 that the signal paths interconnecting branch BR0 to branches BR2 and BR3 and the signal paths interconnecting branch BR1 to branches BR2 and BR3 are to be blocked. More specifically, gate logic circuit 306 applies "0" signals to output leads $\overline{BD20}$, $\overline{BD30}$, $\overline{BD21}$, $\overline{BD31}$, $\overline{BD02}$, $\overline{BD12}$, $\overline{BD03}$ and $\overline{BD13}$ to instruct gate matrix 214 to sever the paths interconnecting branches BR0 and BR1 with branches BR2 and BR3. In addition, for enabling or completing the path between branches BR0 and BR1, "1" signals are placed on leads $\overline{BD01}$ and $\overline{BD10}$.

The circuitry of block data gate logic circuit 306 advantageously comprises a static logic circuit arranged in accordance with the following Bodean algebraic Expressions:

$$\overline{BD10} = \overline{(f02 + f03 + f12 + f13)} \quad (1)$$
$$\overline{BD01} = \overline{BD10} \quad (2)$$
$$\overline{BD20} = \overline{(f01 + f03 + f12 + f23)} \quad (3)$$
$$\overline{BD02} = \overline{BD20} \quad (4)$$
$$\overline{BD30} = \overline{(f01 + f02 + f13 + f23)} \quad (5)$$
$$\overline{BD03} = \overline{BD30} \quad (6)$$
$$\overline{BD21} = \overline{(f01 + f13 = f02 + f23)} \quad (7)$$
$$\overline{BD12} = \overline{BD21} \quad (8)$$
$$\overline{BD31} = \overline{(f01 + f12 + f03 + f23)} \quad (9)$$
$$\overline{BD13} = \overline{BD31} \quad (10)$$
$$\overline{BD32} = \overline{(f02 + f12 + f03 + f13)} \quad (11)$$
$$\overline{BD23} = \overline{BD32} \quad (12)$$

The terms to the left of each Expression identify the binary condition ("1" or "0" ) of the correspondingly identified output leads of gate logic circuit 306 while the terms to the right of each Expression identify the binary condition of each of the input leads of gate logic circuit 306. Appropriate circuitry for realizing these Expressions is described, for example, in Chapter 3, pages 23–37 and Chapter 4, pages 45–62 of *Design of Digital Computers*, by Hans W. Gschwind, published by Springer-Verlag New York, Inc., 1967, Fifth Printing February, 1970.

Enable idle logic circuit 307 determines which branch or branches receive the idle circuit words. The information for idle logic circuit 307 is derived from identification circuit 304, as previously noted, and from the C- leads in cable 227. The logic of idle logic circuit 307 is that a branch will receive the idle control words if all other branches are idle or if another branch pair is locked and all the remaining other branches are idle.

The output leads of logic circuit 307 comprise leads EI0, EI1, EI2 and EI3, each lead being individual to a correspondingly numbered branch. The leads are combined in cable 309 and thus passed to gate matrix 214. If the branch is to receive the idle control word, the corresponding output lead has a "1" signal applied thereto. For example, if branch BR0 is to receive an idle control word, a "1" signal is applied to output lead EI0, instructing the gate matrix to form a signal path IDLE lead 310 to the output circuit of branch BR0. If the idle word is not to be applied to the branch, a "0" signal is applied to output lead EI0.

Enable idle logic circuit 307 advantageously comprises a conventional static logic circuit which satisfies the following algebraic Expressions:

$$EI0 = (C1 \cdot C2 \cdot C3) + (f12 \cdot C3) + (f13 \cdot C2) + (f23 \cdot C1) \quad (13)$$
$$EI1 = (C0 \cdot C2 \cdot C3) + (f02 \cdot C3) + (f03 \cdot C2) + (f23 \cdot C0) \quad (14)$$
$$EI2 = (C0 \cdot C1 \cdot C3) + (f01 \cdot C3) + (f03 \cdot C1) + (f13 \cdot C0) \quad (15)$$
$$EI3 = (C0 \cdot C1 \cdot C2) + (f01 \cdot C2) + (f02 \cdot C1) + (f12 \cdot C0) \quad (16)$$

In the Expressions above, each of the terms to the left of the Expression identifies the binary condition provided to the correspondingly identified output lead of enable idle logic circuit 307 while the terms to the right of the Expression identify the binary input condition of correspondingly identified input leads.

The circuit components for incoming circuit 206 comprise line terminator 230, shift register 231, gate 232 and flip-flop 233. Incoming circuits 207, 208 and 209 are arranged and operate in substantially the same manner as incoming circuit 206.

The 8-bit data words or bytes from branch BR0 which are received on incoming path 103A are applied to line terminator 230. Line terminator 230 converts these incoming line signals to data bits and serially applies them to shift register 231.

Shift register 231 has a plurality of stages, sufficient in number to store the eight bits of a byte. The incoming data bit stream is shifted in and through the several stages of the shift register in response to bit clock pulses derived from lead BC. The serial output of the last stage of the shift register is passed to gate 232. The condition of the first stage of the shift register is at the same time passed to the "D" input of flip-flop 233.

The toggle input "T" of flip-flop 233 is connected to lead BP which carries the byte clock pulse. Flip-flop 233 is arranged to be toggled by the byte clock pulse to the SET condition when a "1" bit is applied to its "D" input. Alternatively, in the absence of the application of a "1" bit to the "D" input of flip-flop 233; that is, when a "0" bit is applied to the "D" input, flip-flop 233 is toggled by the byte clock pulse to the CLEAR condition.

It was previously noted that the byte clock pulse occurs within the eighth time slot of the byte. At the beginning of this eighth time slot, the eighth bit is inserted in the first stage of the shift register. Accordingly, the eighth bit of the data word is being applied to the "D" input of flip-flop 233 when the byte clock pulse occurs. Since the eighth bit is a "1" bit in a data word and a "0" bit in an idle control word, flip-flop 233 is toggled to the SET condition when a data word is in shift register 231 and to the CLEAR condition when a control word is in the shift register.

The $\overline{Q}$ output of flip-flop 233 is connected to lead C0. When a control word is in shift register 231, flip-flop 233 is in the CLEAR condition and a "1" bit is applied to lead C0. This "1" bit is then passed through cable 227 to locked pair identification circuit 304, advising the identification circuit that branch BR0 is in the idle condition.

The Q output of flip-flop 233 is connected to lead D0. Lead D0 extends by way of cable 228 to identification circuit 304. When a data word is in shift register 231, flip-flop 233 is SET, applying a "1" bit to lead D0, advising identification circuit 304 that branch BR0 is signaling.

The Q output of flip-flop 233 is also connected to gate 232. Gate 232 is therefore enabled when flip-flop 233 is in the SET condition. Accordingly, gate 232 is enabled when a data word is in shift register 231 and disabled when a control word is in the shift register. Thus, when branch BR0 applies a control word to incoming circuit 206, gate 232 becomes disabled, blocking the passage of the control word therethrough. If a data word is received from branch BR0, gate 232 is enabled and the data word which has been shifted into shift register 231 is serially passed through gate 232 to output lead 215, which, as previously disclosed, extends to gate matrix 214.

Outgoing circuit 210 comprises timing buffer 234 and line driver 235. Outgoing circuits 211, 212 and 213 are arranged and operate in substantially the same manner as outgoing circuit 210. Timing buffer 234 normally functions to retime and realign the serial bit stream derived from gate matrix 214 by way of lead 219. The retiming and realigning is under the control of the bit clock pulses on lead $\overline{BC}$. More specifically, the timing buffer provides a delay which, when added to the delays of prior circuits, such as the shift registers, reestablishes the correct phase of each data byte. The output bit stream of timing buffer 234 is passed to line driver 235. The line driver retimes each bit under the control of the clock pulses on lead $\overline{BC}$ and repeats the bit to outgoing path 103B of branch BR0.

Gate matrix 214 generally comprises gate circuits 223, 224, 225 and 226; each of the four gate circuits individually providing signal path connections to output leads 219, 220, 221 and 222, respectively, and each of the gate circuits being arranged and operating in substantially the same manner. Signal path inputs to each of the gate circuits are provided by the output leads of the incoming circuits of all of the other branches and, in addition, by the idle word on IDLE lead 310. It is the general function of each gate circuit to complete a signal path from one or the other of the incoming circuits of the other branches or from idle generator 303 to the outgoing circuit associated with the gate circuit. It is to be noted, therefore, that the incoming circuit of each branch is connected to gate circuits associated with outgoing circuits of all of the other branches while idle generator 303 is connected to all of the gate circuits.

Gate circuit 223 consists of NAND gates 236, 237, 238, 239 and 240. Gates 236, 237 and 238 are connected to signal paths extending from the output leads of the incoming circuits of branch BR1, branch BR2 and branch BR3, respectively. Gate 239 is connected to the signal path extending from idle generator 203, which path comprises lead 310, which carries the idle control word.

Control for gate 236 is provided by lead $\overline{BD10}$. As previously described, block data gate logic circuit 306 provides a "1" signal to lead $\overline{BD10}$ to enable the signal path between the incoming side of branch BR1 and the outgoing side of branch BR0, and applies a "0" signal to lead $\overline{BD10}$ to block or sever this signal path. The application of the "1" signal to lead $\overline{BD10}$ enables gate 236. Accordingly, the incoming data from branch BR1 applied to output lead 216 of the incoming circuit 207 is passed through gate 236 which inverts the data. This inverted data is then passed through and re-inverted by NAND gate 240 to lead 219 and then to the outgoing circuit 210 of branch BR0. Thus, with gate 236 enabled, the signal path between the incoming side of branch BR1 and the outgoing side of branch BR0 is completed, permitting the data from branch BR1 to pass to branch BR0. Of course, if branch BR1 is idle and control words are therefore being received from the branch, the incoming circuit blocks the control word and gate 236 passes a stream of "1" bits to NAND gate 240.

If the signal path is to be severed or blocked, block data gate logic circuit 306 applies a "0" signal to lead $\overline{BD10}$. Gate 236 is disabled and the gate passes a stream of "1" bits to NAND gate 240, precluding the passage of data from branch BR1 to NAND gate 240. Similarly, each of gates 237 and 238 pass data therethrough when the signal paths from branch BR2 and branch BR3 are enabled and block data when the branch is blocked or severed.

Gate 239 is controlled by lead EI0. As previously described, lead EI0 has a "1" signal applied thereto by enable idle logic circuit 307 when the idle word is to be passed through branch BR0 and has a "0" signal applied thereto when the idle control word is to be blocked. The application of the "1" signal to lead EI0 enables gate 239. The gate now inverts the idle word on lead 310. The idle word passed through gate 239 is then re-inverted by and passed through NAND gate 240. With a "0" signal on lead EI0, gate 239 is disabled and applies a stream of "1" bits to NAND gate 240. Thus, the idle control word on lead 310 is blocked.

Each of the other gate circuits is similarly arranged and controlled by appropriate outputs of enable idle logic circuit 307 and block data gate logic circuit 306 to complete or to sever the various signal paths extnding to the associated ones of the output circuits of the branches.

Storage of locked pair designations is provided by flip-flop 315 through 320 in locked pair identification circuit 304. When branch BR0 and branch BR1 are designated as a locked pair, flip-flop 315 is operated to the SET condition in a manner described hereinafter. In this condition, a high potential is provided to the Q output of the flip-flop and this potential is passed (as a "1" signal) to output lead f01. Lead f01 then is applied through cable 305, as previously described. In the absence of the designation that branches BR0 and BR1 are locked, flip-flop 315 is in the CLEAR state; the potential at the output Q terminal is low and a "0" signal is therefore applied to output lead f01.

Similarly, designation of branch BR0 and branch BR2 as locked is provided by flip-flop 316 whose output Q terminal is connected to lead f02. The remaining flip-flops 317 through 320 similarly store indications of other locked pairs of the several branches and each of these flip-flops' output Q terminal is connected to an f- lead to indicate whether or not the corresponding branch pair is locked.

One set of input indications for locked pair identification circuit 304 is provided by the C- leads which individually carry "1" signals when the branch associated therewith is in the idle condition. The C-leads, as previously described, are carried within cable 227 and are connected, in pairs, to OR gates 350 through 355 in locked pair identification circuit 304. In the event that branch BR0 is in the idle condition, a "1" signal is applied to lead C0, as previously described. Lead C0 extends to inputs of OR gates 350 through 352. The outputs of OR gates 350 through 352, in turn, are connected to the CLEAR inputs of flip-flops 315 through 317. Accordingly, these latter flip-flops are cleared or maintained in the CLEAR condition when branch BR0 is idle. It is to be noted that flip-flops 315 through 317 store locked pair designations wherein one branch of the locked pair is branch BR0.

Similarly, lead C1 extends to OR gates 350, 353, and 354 and the application of a "1" signal to this lead clears or maintains CLEAR flip-flops 315, 318 and 319. These latter flip-flops thus would indicate that the pairs which include branch BR1 are not locked. In a similar manner lead C2 and C3 extend through OR gates to clear or maintain cleared those flip-flops which identify pairs which include branches BR2 and BR3.

The indications that the branches are signaling are provided by leads D0 through D3, as previously described. Leads D0 through D3 are passed through cable 228 and to AND gates 335 through 338, respectively. The other input to AND gate 335 is the output of NOR gate 330. As disclosed hereinafter, the output of the NOR gate is high when branch BR0 is not one of a locked pair. In this event, NOR gate 330 enables AND gate 335. If we assume that branch BR0 is now signaling, the "1" signal on lead D0 is passed through AND gate 335 and applied to AND gates 340 through 342.

It is noted above that the lead D1 extends to one input of gate 336. The other input to gate 336 extends to the output of NOR gate 331 and the output of NOR gate 331 is high if branch BR1 is not identified as one branch of a locked pair. Assuming branch BR1 is now signaling, the "1" signal applied to lead D1 is passed through AND gate 336 and applied in parallel to AND gates 340, 343 and 344. We had previously assumed that branch BR0 is not in a locked pair and is now signaling. With both branches BR0 and BR1 signaling, "1" bits are simultaneously applied to both inputs of AND gate 340, AND gate 340 producing a "1" bit at its output, passing the "1" bit to the SET input of flip-flop 315. Flip-flop 315 is thereupon SET, identifying branches BR0 and BR1 as a locked pair by applying a "1" signal or high condition to lead f01.

The high condition on lead f01 is also fed back to NOR gates 330 and 331. The output conditions of the NOR gates thereupon go low, disabling gates 335 and 336. This has the effect of precluding either one of these branches (branch BR0 and branch BR1) from locking with any third branch which may initiate signaling. It is to be noted that NOR gates 332 and 333 are not affected by the setting of flip-flop 315. These NOR gates may continue to enable AND gates, such as gates 337 and 338. Thus, if branch BR2 or branch BR3 should initiate signaling, the "1" signals provided to their D- leads would pass through AND gates 337 and 338 to enable them to become a locked pair if they should signal simultaneously.

In summary, locked pair identification circuit 304 recognizes the simultaneous signaling of two branches to store the identification that these branches are a locked pair. These branches are then precluded from becoming locked pairs with other branches and at the same time other branches may become locked if they should signal simultaneously. These locked pair designations are always cleared out when one or the other of the branches becomes idle.

Figure 6:
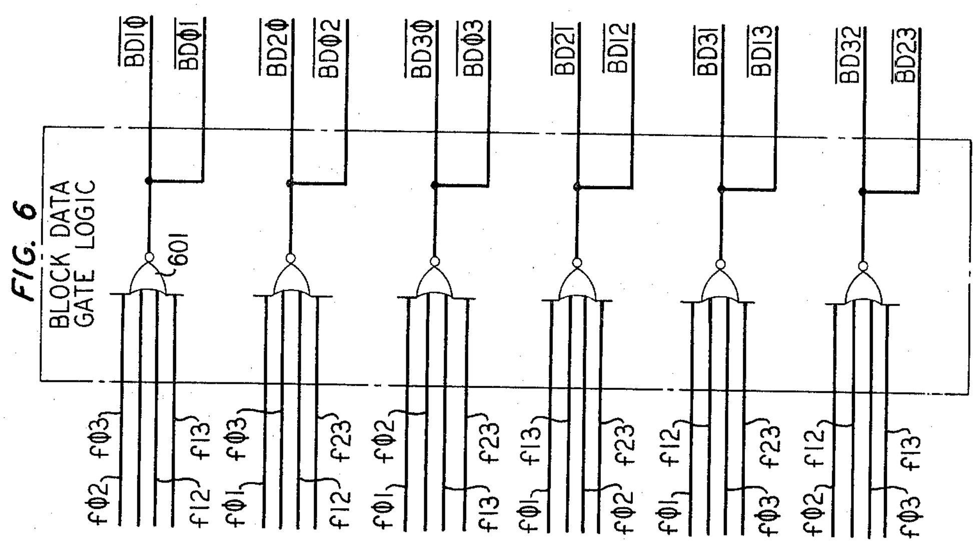
FIGS. 5 and 6 disclose, in schematic form, the details of exemplary circuitry for logic circuits shown in FIG. 3, which logic circuits form part of the four-branch symmetrical junction unit.

A realization of a block data gate logic circuit which operates in accordance with the Boolean algebraic requirements of block data gate logic circuit 306 is shown in FIG. 6. As seen in FIG. 6, the logic circuit comprises a plurality of NOR gates, each NOR gate arranged to satisfy one Expression. For example, NOR gate 601 satisfies algebraic Expression (1) for block data gate logic 306. The inputs to NOR gate 601 consist of leads f02, f03, f12 and f13. The output of NOR gate 601 is connected to lead $\overline{BD10}$ and is also connected to lead $\overline{BD01}$ since, as noted in Expression (2), the values on these latter output leads are identical. Accordingly, "1" signals are applied to these output leads (to then enable the signal paths interconnecting branches BR1 and BR0) in the event that "0" signals are applied to all of the input leads of NOR gate 601. A "0" signal is applied to lead f02 when branches BR0 and BR2 are not a locked pair. Similarly, "0" bits are applied to leads f03, f12 and f13 when the correspondingly numbered branches are not locked pairs. Accordingly, the output of NOR gate 601 provides "1" bits when neither one of branches BR0 and BR1 is locked with branches BR2 and BR3. In the event, however, that one or the other of branches BR0 and BR1 becomes one of the locked pair with branches BR2 or Br3, then a "0" signal is applied to an input of NOR gate 601 and the gate, in turn, applies a "1" bit to output leads $\overline{BD10}$ and $\overline{BD01}$. Thus, NOR gate 601 satisfies the algorithm that a "1" bit is applied to output lead $\overline{BD10}$ and $\overline{BD01}$ to block or sever the associated signal paths in the event that at least one or the other of the branches is locked to a branch other than the other branch in the pair. An inspection of FIG. 6 discloses that others of the NOR gates similarly satisfy the remaining Expressions for block data gate logic circuit 306.

Figure 5:
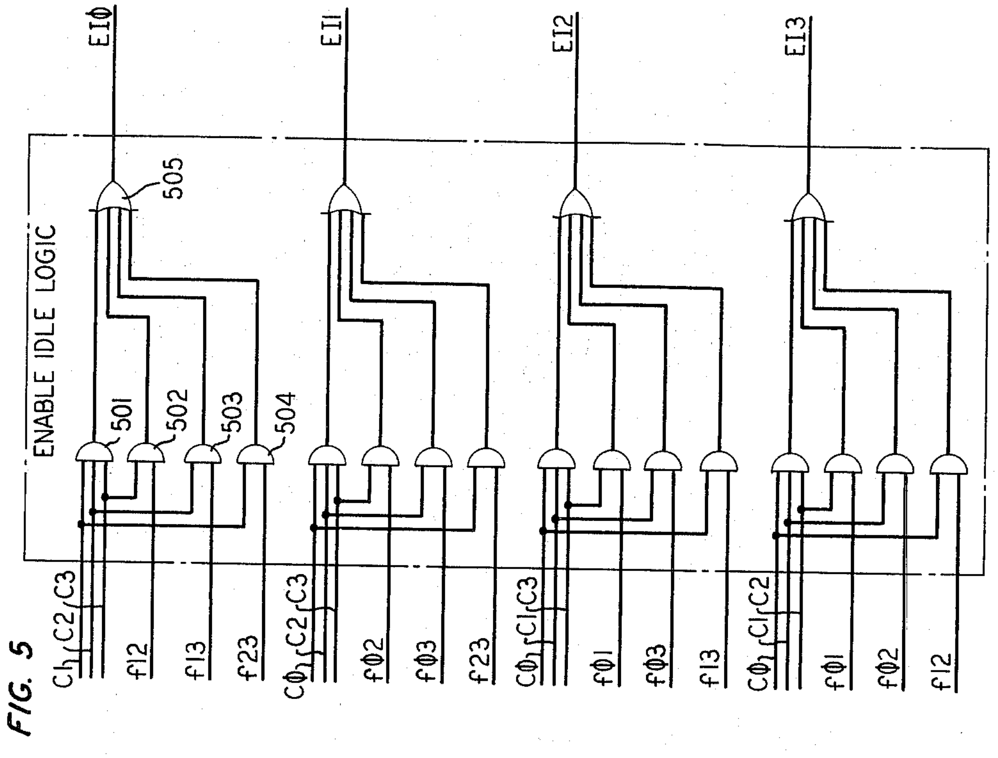

A realization of a logic circuit satisfying the Expressions for enable idle logic circuit 307 is shown in FIG. 5. As seen in FIG. 5, each Expression is satisfied by sets of gates, Expression (13) being satisfied by AND gates 501 through 504 and OR gate 505. The input to AND gate 501 comprises leads C1, C2 and C3 and, if all of branches BR1, BR2 and BR3 are idle, "1" signals are applied to all of the input leads of AND gate 501 and the AND gate passes a "1" signal out through OR gate 505 to output lead EI0, thus satisfying a first term of Expression (13). If branches BR1 and BR2 are locked, a "1" signal is applied to lead f12 and passed to AND gate 502. The other input to AND gate 502 is connected to lead C3 and thus, if branch BR3 is now idle, AND gate 502 passes a "1" signal through OR gate 505, satisfying the next term in Expression (13). Similarly, AND gates 503 and 504 satisfy the last two terms in Expression (13). Accordingly, AND gates 501 through 504 and OR gate 505 provide the logic that a "1" signal is provided to output lead EI0 to pass an idle word to branch BR0 if branches BR1, BR2 and BR3 are idle or, if two of these branches are locked and the remaining other branch is idle. In the same manner, other sets of gates in the logic circuit seen in FIG. 5 satisfy the remaining algebraic Expressions for enable idle logic circuit 307.

It is to be appreciated that the junction unit may be modified to accommodate additional branches by adding correponding incoming and outgoing circuits and adding gate circuits in gate matrix 214 modified to accommodate the additional signal paths. Locked pair identification circuit 304 is also modified by adding flip-flops for each additional branch pair together with the circuitry associated with each flip-flop previously described. Block data gate logic circuit 306 and enable idle logic circuit 307 are also modified; the Boolean algebraic Expressions for these logic circuits being changed to satisfy the algorithms previously discussed and the realization of these circuits being designed in accordance with the above-mentioned publication of H. W. Gschwind.

Although a specific embodiment of this invention has been shown and described, it will be understood that various other modifications may be made without departing from the spirit of this invention.

We claim:

1. A junction unit for terminating at least four two-way branch lines, the junction unit including a signal path interconnecting an incoming side of each branch line with an outgoing side of each of the other branch lines,

CHARACTERIZED IN THAT the junction unit includes means individual to each signal path for selectively severing the individual signal path in response to concurrent reception of signals from either one of the branch lines interconnected by the signal path and from a different one of the branch lines.

2. A junction unit for terminating at least four two-way branch lines comprising, signal gating means for interconnecting an incoming side of each branch to an outgoing side of each of the other branches;

means responsive to concurrent reception of signals from pairs of branches for storing a designation that the two branches are locked; and means for controlling each of the gating means in response to stored designations of branch pairs which include one of the two branches interconnected by the gating means, the controlling means being independent of stored designations of branch pairs which include none of the two branches interconnected by the gating means.

3. A junction unit in accordance with claim 2 wherein the controlling means includes means for disabling the gating means in response to a stored designation that at least one of the two interconnected branches is locked with a branch other than the other interconnected branch.

4. A four-branch junction unit for a digital data signaling system, each branch conveying, in two directions, data words defining message text information and control words defining branch conditions, the junction unit comprising, normally enabled gating means for interconnecting each branch with each of the other branches;

means responsive to concurrent reception of data words from any two branches for storing a designation that the two branches are locked to each other; and means for disabling each of the gating means in response to a stored designation that either one of the branches interconnected thereby is locked wtih a branch other than the other one of the interconnected branches; the disabling means being unresponsive to stored designations of pairs of branches not including one of the interconnected branches.

5. A junction unit in accordance with claim 4, and including means responsive to reception of control words from a locked branch for clearing the stored designation.

6. A junction unit in accordance with claim 4 wherein the storing means includes a plurality of storage units individual to each of the pairs of branches for storing the locked designation of the pair individual thereto and means responsive to the storage of the locked designation for precluding storage in units individual to pairs of branches which include one but not both branches of the locked pair.

7. A junction unit, in accordance with claim 4, and further including means for generating control words;

means for applying the generated control words to each branch; and means responsive to the reception of control words from all other branches for enabling the applying means.

8. A junction unit, in accordance with claim 5, wherein the enabling means is further responsive to the stored designation of other branches being locked and the reception of control words from all other unlocked branches.

* * * * *